US008676907B2

(12) United States Patent
Umeshima et al.

(10) Patent No.: US 8,676,907 B2
(45) Date of Patent: Mar. 18, 2014

(54) RELAY APPARATUS, RELAY METHOD AND RECORDING MEDIUM

(75) Inventors: Shingo Umeshima, Hamamatsu (JP);
Masayuki Mizushima, Hamamatsu (JP);
Yoshinobu Iwasaki, Okazaki (JP)

(73) Assignee: Yamaha Corporation (JP)

( * ) Notice: Subject to any disclaimer, the term of this patent is extended or adjusted under 35 U.S.C. 154(b) by 390 days.

(21) Appl. No.: 13/059,883

(22) PCT Filed: Aug. 21, 2009

(86) PCT No.: PCT/JP2009/064674
§ 371 (c)(1),
(2), (4) Date: May 10, 2011

(87) PCT Pub. No.: WO2010/021388
PCT Pub. Date: Feb. 25, 2010

(65) Prior Publication Data
US 2011/0213850 A1 Sep. 1, 2011

(30) Foreign Application Priority Data

Aug. 21, 2008 (JP) ................................. 2008-212490

(51) Int. Cl.
*G06F 15/16* (2006.01)
(52) U.S. Cl.
USPC ......................................... 709/206; 709/232
(58) Field of Classification Search
USPC ................................................ 709/206, 232
See application file for complete search history.

(56) References Cited

U.S. PATENT DOCUMENTS

| 7,702,629 B2 * | 4/2010 | Cytron et al. | ......... 707/999.006 |
| 8,112,482 B1 * | 2/2012 | Geddes | ......................... 709/206 |
| 2006/0075228 A1 * | 4/2006 | Black et al. | ................... 713/167 |
| 2007/0124384 A1 | 5/2007 | Howell et al. | |
| 2008/0082658 A1 * | 4/2008 | Hsu et al. | ....................... 709/224 |
| 2008/0131006 A1 * | 6/2008 | Oliver | .......................... 382/229 |
| 2010/0241507 A1 * | 9/2010 | Quinn et al. | ............... 705/14.42 |

FOREIGN PATENT DOCUMENTS

| JP | 11-232304 A | | 8/1999 |
| JP | 11232304 A | * | 8/1999 |
| JP | 2003-067304 A | | 3/2003 |
| JP | 2003067304 A | * | 3/2003 |
| WO | 2007/061581 A1 | | 5/2007 |
| WO | 2008/075426 A1 | | 6/2008 |

OTHER PUBLICATIONS

International Search Report issued in related PCT/JP2009/064674 mailed Sep. 15, 2009.

* cited by examiner

*Primary Examiner* — Liangche A Wang
(74) *Attorney, Agent, or Firm* — Rossi, Kimms & McDowell LLP

(57) ABSTRACT

Disclosed is a technique which prevents description offensive to public order and morals, included in an electronic mail, from meeting the eyes of a receiver. If an electronic mail message is included in a payload part of a data packet delivered from a communication interface 11-2, a control section 13 of a relay apparatus 10-*m* determines whether a character string offensive to public order and morals is included in a body text part thereof. If the character string offensive to public order and morals is included therein, the control section 13 generates hiding data by encoding the body text part in a mail body of the original electronic mail message. The control section 13 overwrites a hiding notification character string in the body text part in the original electronic mail message, generates a body text-hidden electronic mail message which describes the hiding data in a content body of a part different from the body text part, and transmits it to a terminal 20-*i*.

5 Claims, 6 Drawing Sheets

US 8,676,907 B2

RELAY APPARATUS, RELAY METHOD AND RECORDING MEDIUM

This application is a U.S. National Phase Application of PCT International Application PCT/JP2009/064674 filed on Aug. 21, 2009 which is based on and claims priority from JP 2008-212490 filed on Aug. 21, 2008 the contents of which are incorporated herein by reference in their entirety.

TECHNICAL FIELD

The present invention relates to a technique which prevents description offensive to public order and morals included in an electronic mail from meeting the eyes of a receiver thereof.

BACKGROUND ART

An improper or indecent description which makes a receiver feel unpleasant may be included in a junk mail transmitted from a malicious trader. If an electronic mail filtering program such as an anti spam filter is installed in a terminal of the receiver, it is possible to select this kind of junk mail from among all electronic mails which are received by the terminal and to delete it. In the electronic mail filtering program, words which are frequently included in junk mail are provided as a database. A CPU of the terminal which is installed with such an electronic mail filtering program checks words included in an electronic mail with the database when the electronic mail is received, and determines that the electronic mail is a junk mail in a case where the same words as those recorded in the database are included in the electronic mail with a predetermined number or more. Details of a process which is performed by the CPU according to this kind of electronic mail filtering program are disclosed in Patent Document 1, for example.

CITATION LIST

[Patent Document 1] JP-A-2003-067304

SUMMARY OF INVENTION

Technical Problem

In this respect, there is such a kind of electronic mail filtering program that makes, in a case of a received electronic mail is junk mail, a file of the electronic mail and displays an alternative screen to which an icon indicating the file and a character string indicating that a junk mail is received are attached. A user of a terminal which is installed with this kind of program confirms that he or she has received a junk mail by referring to the alternative screen and that he or she can browse a body text of the junk mail by selecting the icon on the screen. Then, when detecting that the icon is selected, the terminal opens the file associated with the icon to display the body text of the original electronic mail.

However, in this case, if the user referring to the alternative screen mistakenly selects the icon, the terminal directly opens the file of the junk mail and displays the body text thereof, which causes a receiver to view an indecent or improper description.

An object of the present invention is to provide a technique which prevents a receiver who receives an electronic mail message including an improper or indecent description from viewing a content of the description due to an unintended manipulation.

Solution to Problem

According to an embodiment of the present invention, there is provided a relay apparatus including: a storing section configured to store an electronic mail message; a determining section that determines whether text data indicating a predetermined character string is included in a mail body of the electronic mail message stored in the storing section; and a message hiding processing section that generates hiding data when the determining section determines that the text data indicating the predetermined character string is included in the mail body, and transmits an electronic mail message which describes the hiding data instead of the text data indicating the predetermined character string. The hiding data is obtained by encoding at least the text data indicating the predetermined character string in the mail body according to a predetermined encoding process.

Advantageous Effects of Invention

According to the present invention, the determining section determines whether the predetermined character string indicating, for example, an improper or indecent word is included in the mail body of the electronic mail message. Then, the message hiding processing section generates the hiding data which is obtained by encoding at least the text data indicating the predetermined character string in the mail body according to a predetermined encoding process when it is determined that the predetermined character string is included in the mail body, and transmits the electronic mail message which describes the hiding data instead of the text data indicating the predetermined character string in the electronic mail message. According to the type of the encoding method of the encoded data included in the electronic mail message received from the relay apparatus, the terminal displays the encoded data as an attached file without decoding the encoded data. Accordingly, by selecting such an encoding process in which the encoded data is treated as an attached file on the terminal side and by encoding a predetermined character string indicating an improper or indecent word according to the encoding process and transmitting it, it is possible to prevent the problem that the character string meets the eyes of a receiver to make the receiver feel unpleasant.

DESCRIPTION OF EMBODIMENTS

Hereinafter, embodiments of the invention will be described with reference to the accompanying drawings.

Figure 1:
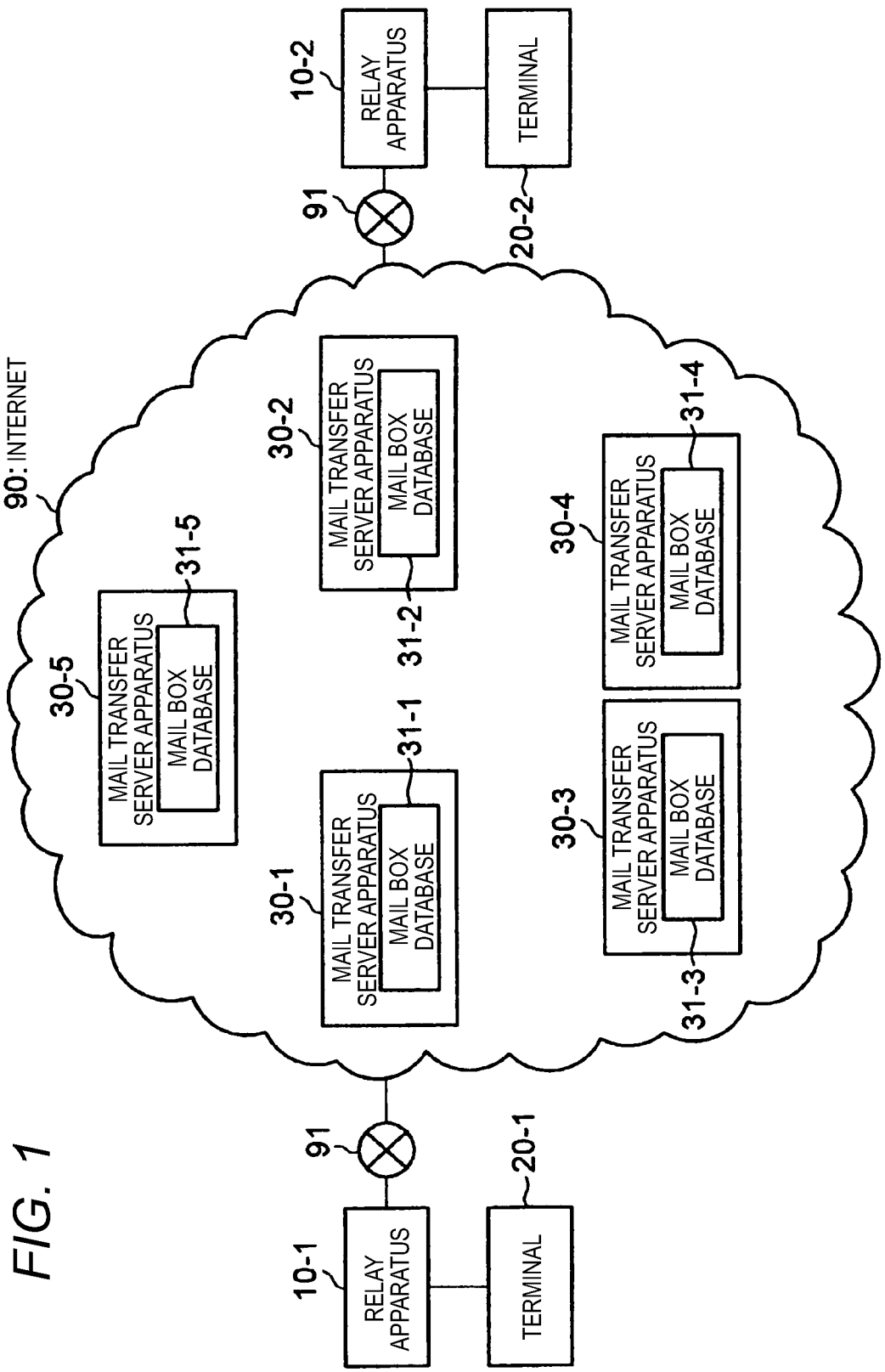
FIG. 1 is a diagram illustrating an overall configuration of an electronic mail transfer system including a relay apparatus according to an embodiment of the present invention.

FIG. 1 is a diagram illustrating an overall configuration of an electronic mail transfer system including relay apparatuses 10-$m$ (m=1, 2, ... ) according to an embodiment of the present invention.

In FIG. 1, terminals 20-$i$ (i=1, 2, ... ) are personal computers, for example. The terminals 20-$i$ (i=1, 2, ... ) are installed with a browser program and a mailer program. The browser program receives data described by HTML (Hyper-Text Markup Language) (referred to as "HTML data") and allows the terminals 20-$i$ (i=1, 2, ... ) to execute a process for displaying a screen of a layout indicated by the HTML data. The mailer program allows the terminals 20-$i$ (i=1, 2, ... ) to execute a process for generating, transmitting/receiving and displaying an electronic mail message in accordance with an MIME (Multipurpose Internet Mail Extension) format.

Figure 2:
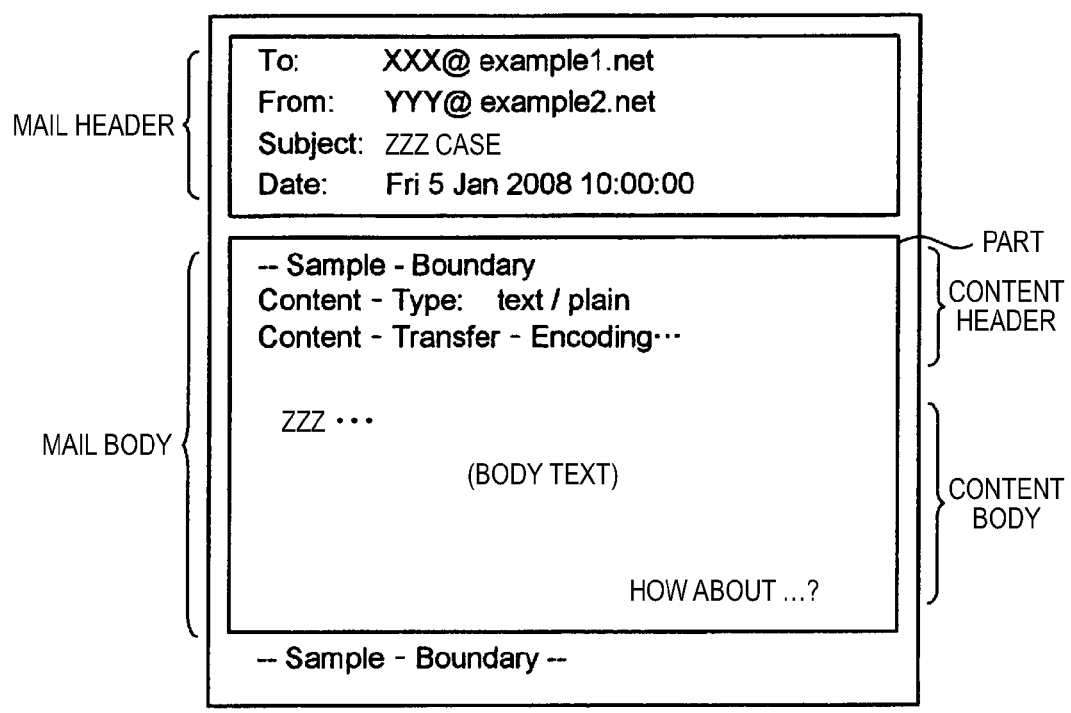
FIG. 2 is a diagram illustrating a structure of data on an electronic mail message of an MIME format.

As shown in FIG. 2, the electronic mail message of the MIME format includes a mail header and a mail body. The mail header of the electronic mail message has a plurality of header fields. In these header fields, a destination electronic mail address, a transmission source electronic mail address, a subject, a sent date and time and the like are described as text data (hereinafter, referred to as "text data") in accordance with US-ASCII or ISO-2022-JP.

In an example of FIG. 2, in the first header field of the mail header, text data indicating "To" which is a header name and "XXX@example1.net" which is a destination electronic mail address are described. In the second header field of the mail header, text data indicating "From" which is a header name and "YYY@example2.net" which is a transmission source electronic mail address is described. In the third header field of the mail header, text data indicating "Subject" which is a header name and "ZZZ subject" which is a subject name is described. In the fourth header field of the mail header, text data indicating "Date" which is a header name and "Fri 5 Jan. 2008 10:00:00" which is a sent date and time is described.

In the mail body, data indicating a variety of contents such as a body text of an electronic mail message, an image file or an audio file attached to the electronic mail message is described in every cluster called a part.

The part has a content header and a content body. In the content body of the part, text data indicating a character string of the electronic mail message body text and encoded data obtained by encoding data such as an image other than the text data according to an encoding method of Base 64 are described. In the content header of the part, text data indicating the format of the data described in the content body of the part and the like are described.

In the example of FIG. 2, the mail body includes one part. In the content body of the part, text data indicating "How about ZZZ ... ?" which is the body text of the electronic mail message is described. Further, in the content header, text data indicating "Content-Type:text/plain" is described. In the MIME, in a case where the electronic mail message including the part in which the text data indicating "Content-Type:text/plain" is described is received, the terminals 20-$i$ analyze that the body text of the electronic mail message is described in the part.

Further, in a case where the number of the parts in the mail body is 2 or more, in the content body of each part of the second part and thereafter, encoded data obtained by encoding image data, audio data, binary data or the like according to the Base 64 is described. Further, in each content header, text data indicating "Content-Type:image/gif", "Content-Type:audio/basic" "Content-Type:application/octet-stream" and the like is described. In the MIME, in a case where the electronic mail message including the part in which the text data is described in the content header is received, the terminals 20-$i$ analyze that an attachment file is described in the part.

In FIG. 1, mail transfer server apparatuses 30-$n$ (n=1, 2, ... ) are server apparatuses which are installed with an SMTP (Simple Mail Transfer Protocol) and a POP (Post Office Protocol) 3. The SMTP is a protocol associated with transmission of the electronic mail message by means of the terminals 20-$i$. The POP 3 is a protocol associated with reception of the electronic mail message by means of the terminals 20-$i$. The mail transfer server apparatuses 30-$n$ (n=1, 2, ... ) form the Internet 90 together with a variety of server apparatuses such as a DNS (Domain Name System) server apparatus (not shown), a WWW (World Wide Web) server apparatus (not shown), or the like.

The mail transfer server apparatuses 30-$n$ (n=1, 2, ... ) have mail box databases 31-$n$ (n=1, 2, ... ). In the mail box databases 31-$n$ (n=1, 2, ... ) of the mail transfer server apparatuses 30-$n$ (n=1, 2, ... ), a plurality of mail boxes is formed. In each mail box of the mail box databases 31-$n$ (n=1, 2, ... ), an electronic mail message in which an electronic mail address of a person who has a mail account of the mail transfer server apparatus 30-$n$ is used as a destination electronic mail address is stored.

In the SMTP, the mail transfer server apparatuses 30-$n$ (n=1, 2, ... ) receive the electronic mail message from the terminals 20-$i$. Further, in a case where an electronic mail message is received in which an electric mail address of a person who has a mail account of the mail transfer server apparatus 30-$n$ is used as a destination electronic mail address, the mail transfer server apparatus 30-$n$ (n=1, 2, ... ) stores the electronic mail message in the mail box database 31-$n$ of the mail transfer server apparatus 30-$n$. Further, in a case where an electronic mail message is received in which an electric mail address of a person who has a mail account of a different mail transfer server apparatus 30-$n$ is used as a destination electronic mail address, the mail transfer server apparatus 30-$n$ transfers the electronic mail message to the mail transfer server apparatus 30-$n$. The transferred electronic mail message is stored in the mail box database 31-$n$ of the mail transfer server apparatus 30-$n$, by the mail transfer server apparatus 30-$n$ of a transfer destination.

In the POP 3, the mail transfer server apparatus 30-$n$ (n=1, 2, ... ) receives a user ID from the terminal 20-$i$ which has a mail account of the corresponding mail transfer server apparatus 30-$n$, performs an ID authentication process using the user ID, receives a password from the terminal 20-$i$, and then performs a password authentication process using the password. Then, if these authentication processes are all terminated, the corresponding mail transfer server apparatus 30-$n$ reads out the electronic mail message stored in the corresponding mail box in the mail box database 31-$n$, and then transmits it to the terminal 20-$i$.

The relay apparatuses 10-$m$ (m=1, 2, ... ) are apparatuses which relay transmission/reception of data packets between the terminals 20-$i$ under the relay apparatuses 10-$m$ and a variety of servers in the Internet 90.

Figure 3:
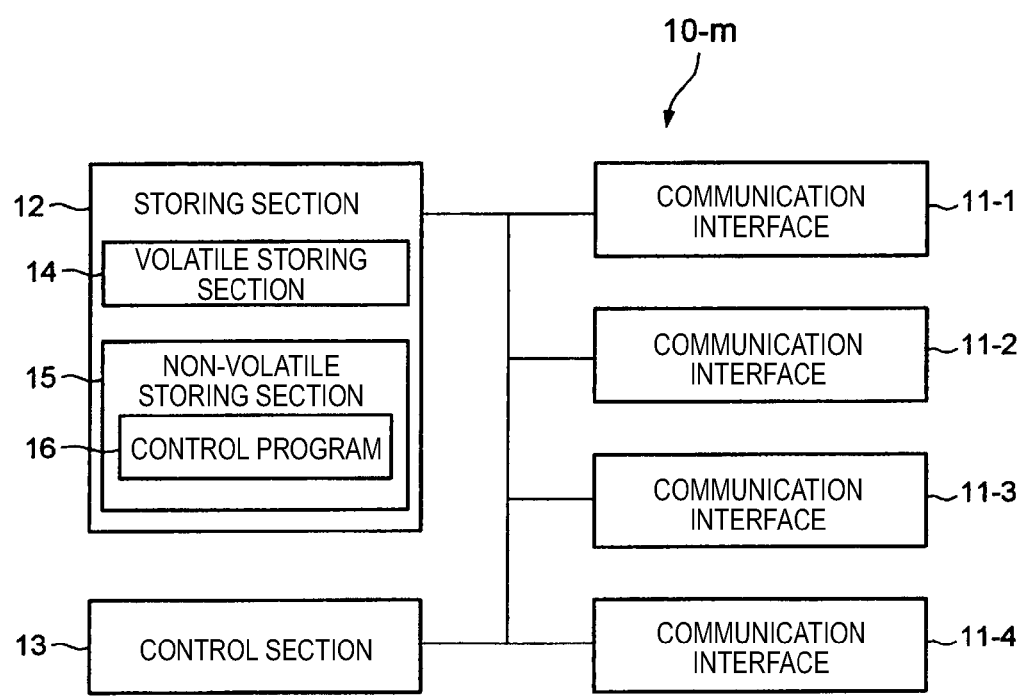
FIG. 3 is a block diagram illustrating a configuration of a relay apparatus in FIG. 1.

FIG. 3 is a block diagram illustrating a configuration of the relay apparatus 10-$m$. The relay apparatus 10-$m$ includes communication interfaces 11-$k$ (k is 1 to 4), and a storing section 12, and a control section 13. The communication interfaces 11-$k$ (k is 1 to 4) are NICs (Network Interface Card). At least one (for example, a communication interface 11-1) of the communication interfaces 11-$k$ (K is 1 to 4) of the relay apparatus 10-$m$ is connected to the terminals 20-$i$ which form a LAN (Local Area Network) together with the corresponding relay apparatus 10-$m$, and at least a remaining one (for example, a communication interface 11-2) is connected to a line 91 which is linked with the Internet 90. The communication interfaces 11-1 and 11-2 receive an Internet (registered trademark) frame (hereinafter, simply referred to as "frame") using MAC addresses of the communication interfaces 11-1 and 11-2 as destination MAC addresses, and then deliver a data packet included in the frame to the control section 13.

The storing section 12 includes a volatile storing section 14 and a non-volatile storing section 15. The volatile storing section 14 is a RAM and supplies a work area to the control section 13. The non-volatile storing section 15 is a hard disk or a Flash ROM, for example. In the non-volatile storing section 15 is stored a control program 16. The control program 16 is a program which allows the control section 13 to execute a transfer process, an electronic mail storing process, a determination process, a message hiding process, a hiding release data storing process and a message hiding release process.

In the transfer process, in a case where the destination IP address of the data packet delivered from the communication interfaces 11-1 or 11-2 belongs to the terminal 20-i under the relay apparatus 10-m, the frame including the data packet is transmitted from the communication interface 11-1, and in a case where the data packet does not belong to the terminal 20-i under the relay apparatus 10-m, that is, in a case where the transfer to the Internet 90 is required, the frame including the data packet is transmitted from the communication interface 11-2.

In the electronic mail storing process, in a case where the electronic mail message is included in a payload part of the data packet delivered from the communication interface 11-2, the electronic mail message is extracted from the data packet and then is stored in an area (referred to as "determination data storing area") secured in the volatile storing section 14.

In the determination process, a part (referred to as "body text part") in which the text data indicating "Content-Type: text/plain" is described is searched for in the mail body of the electronic mail message stored in the determination data storing area, and it is determined whether text data indicating a predetermined character string (referred to as "character string offensive to public order and morals") as words which is offensive to public order and morals is included in the content body of the body text part.

In the message hiding process, in a case where the text data on the character string offensive to public order and morals is included in the content body of the body text part of the electronic mail message stored in the determination data storing area, an electronic mail message (referred to as "text-hidden electronic mail message") in which encoded data (referred to as "hiding data") obtained by encoding the body text part using the Base 64 is described is generated, instead of the body text part, and the data packet which uses the body text-hidden electronic mail message as the payload part is assembled. Then, the frame including the assembled data packet is transmitted from the communication interface 11-1.

In the hiding release data storing process, in a case where the hiding data is included in the payload part of the data packet delivered from the communication interface 11-1, the hiding data is extracted from the data packet and then is stored in an area (referred to as "hiding release data storing area") secured in the volatile storing section 14.

In the message hiding release process, the body text part is restored by decoding the hiding data stored in the hiding release data storing area, and the data packet which uses the restored body text part as the payload part is assembled. Then, the frame including the assembled data packet is transmitted from the communication interface 11-1.

Among the above-described six processes, the transfer process is a known process as a router, and the electronic mail storing process, the determination process, the message hiding process, the hiding release data storing process and the message hiding release process are characteristic processes according to the present embodiment.

Figure 4:
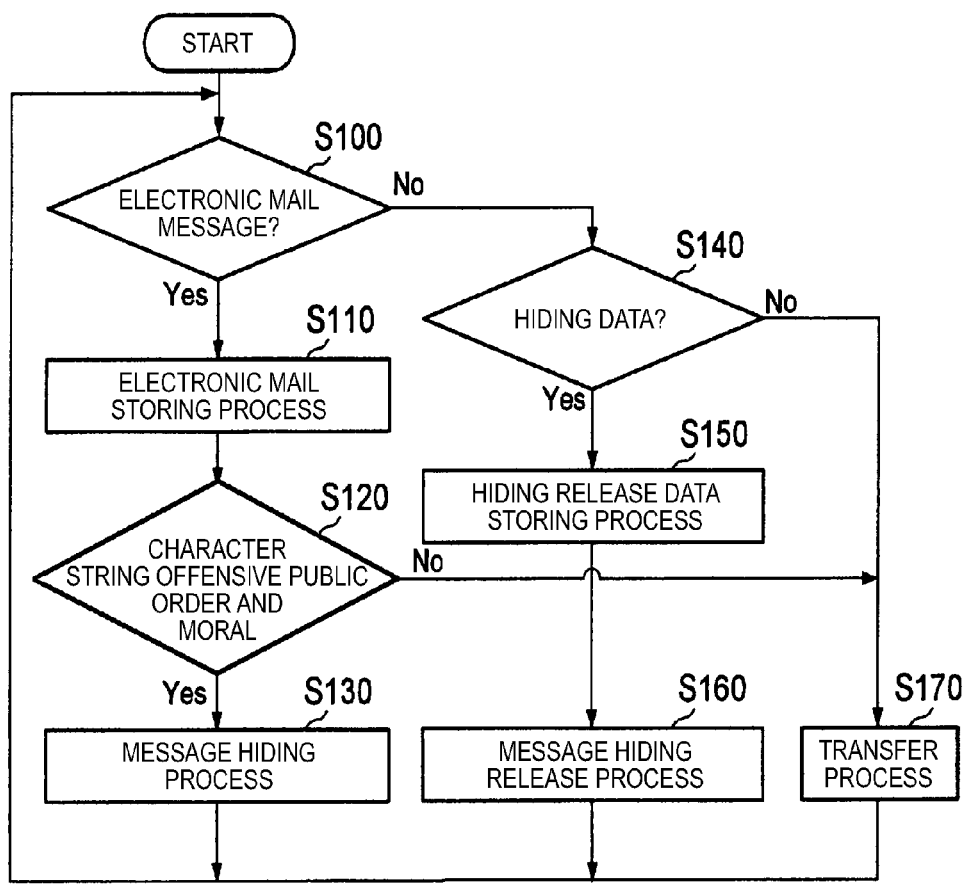
FIG. 4 is a flowchart illustrating an operation of a relay apparatus in FIG. 1.

Next, an operation according to the present embodiment will be described. FIG. 4 is a flowchart illustrating an operation of the relay apparatus 10-m according to the present embodiment. The control section 13 of the relay apparatus 10-m performs an operation in FIG. 4, whenever the data packet is delivered from the communication interfaces 11-1 and 11-2. In FIG. 4, the control section 13 of the relay apparatus 10-m, if the data packet is delivered from the communication interfaces 11-1 and 11-2, determines whether the electronic mail message in which an electronic mail address of a user of the terminal 20-i under the relay apparatus 10-m is used as a destination electronic mail address is included in the payload part of the data packet (S100). Only in a case where the mail transfer server apparatus 30-n transmits the data packet in which the electronic mail message read out from the mail box is used as the payload part to the terminal 20-i, according to the POP 3, and the data packet is delivered from the communication interface 11-2, a determination result of step S100 becomes "Yes". Further, in a case where a data packet other than the above-described data packet is delivered, the determination result of step S100 becomes "No". In a case where it is determined that the electronic mail message in which the electronic mail address of the user of the terminal 20-i under the relay apparatus 10-m is used as the destination electronic mail address is included in the payload part of the data packet (S100; Yes), the control section 13 of the relay apparatus 10-m performs the electronic mail storing process (S110).

The control section 13 stores the electronic mail message extracted from the payload part of the data packet in the electronic mail storing process in the determination data storing area, and then performs the determination process (S120). Then, in step S120, in a case where it is determined that the text data indicating the character string offensive to public order and morals is included in the content body of the body text part in the mail body of the electronic mail message (S120; Yes), the control section 130 performs the message hiding process (S130). The message hiding process will be described in detail.

In the message hiding process, the control section 13 generates the hiding data by encoding the body text part in the mail body of the electronic mail message stored in the determination data storing area using the Base 64, and then overwrites the text data in a character string having the content of "Since this mail is determined as a junk mail, its body text content is hidden. In order to confirm the body text content, please upload the attachment file to the following URL" and a character string indicating the URL (for example, "http://133.176.74.1/decode.mail") of the relay apparatus 10-m, in the content body of the body text part (this character string is referred to as "hiding notification character string").

Then, the control section 13 adds a new part to the mail body of the electronic mail message stored in the determination data storing area, describes the hiding data in the content body of the added part, and describes text data (for example, "Content-Type:application/octet-stream" indicating that the data on the content body in the part is treated as an attachment file data in the content header of the part).

Finally, the control section 13 searches for a header field of a subject name in the mail header of the electronic mail message stored in the determination data storing area, replaces a field value of the header field by text data indicating the character string "This mail is determined as a junk mail", and then sets the electronic mail message in which the replacement of the header field of the subject name is completed to the body text-hidden electronic mail message.

Figure 5:
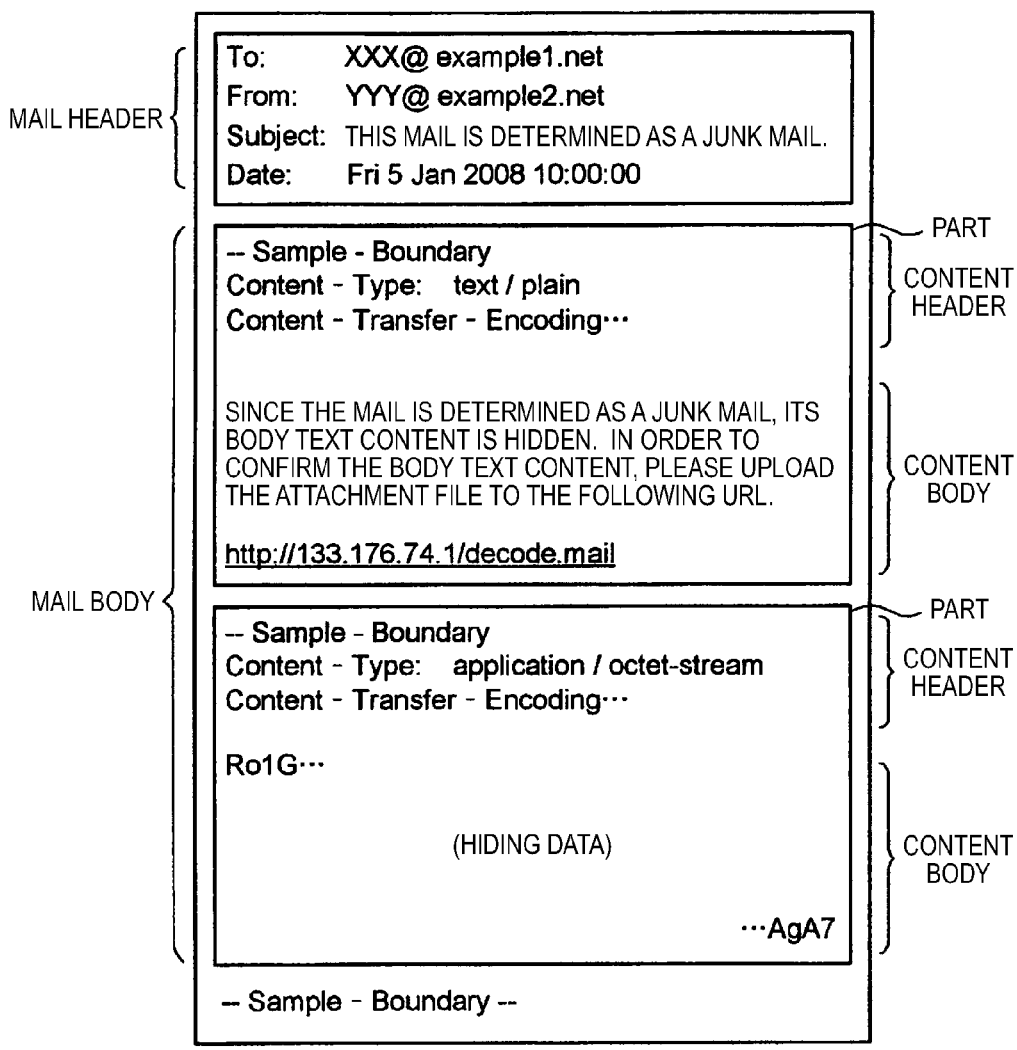
FIG. 5 is a diagram illustrating a structure of data on a body text-hidden electronic mail message.

FIG. 5 is a diagram illustrating the body text-hidden electronic mail message obtained from the electronic mail message shown in FIG. 2. In an example shown in FIG. 5, a field value in the third header field of the mail header is replaced by "This mail is determined as a junk mail" from the "ZZZ subject", and the number of the parts in the mail body is increased to two from one.

In the example shown in FIG. 5, in the content header of the first part, text data having the same content as the content header of the body text part of the original electronic mail message (FIG. 2) is described. The content body is replaced by text data indicating a hiding notification character string from among the text data indicating the character string "How about ZZZ . . . ?".

In the content body of the second part, the hiding data obtained by encoding the body text part of the original electronic mail message (FIG. 2) using the Base 64 is described. In the content header, the text data indicating "Content-Type: application/octet-stream" is described as the text data indicating the format of the data described in the content body.

If the body text-hidden electronic mail message is generated, the control section 13 assembles the data packet in which the electronic mail message is used as the payload part and the IP address of the terminal 20-*i* under the relay apparatus 10-*m* is used as the destination IP address, and transmits the frame including the assembled data packet from the communication interface 11-1. The data packet including the electronic mail message is delivered to the terminal 20-*i* under the relay apparatus 10-*m*.

In a case where the electronic mail message is included in the data packet delivered from the relay apparatus 10-*m*, the terminal 20-*i* extracts the electronic mail message from the data packet, analyzes the extracted electronic mail message, and then displays it on a mail screen.

Figure 6:
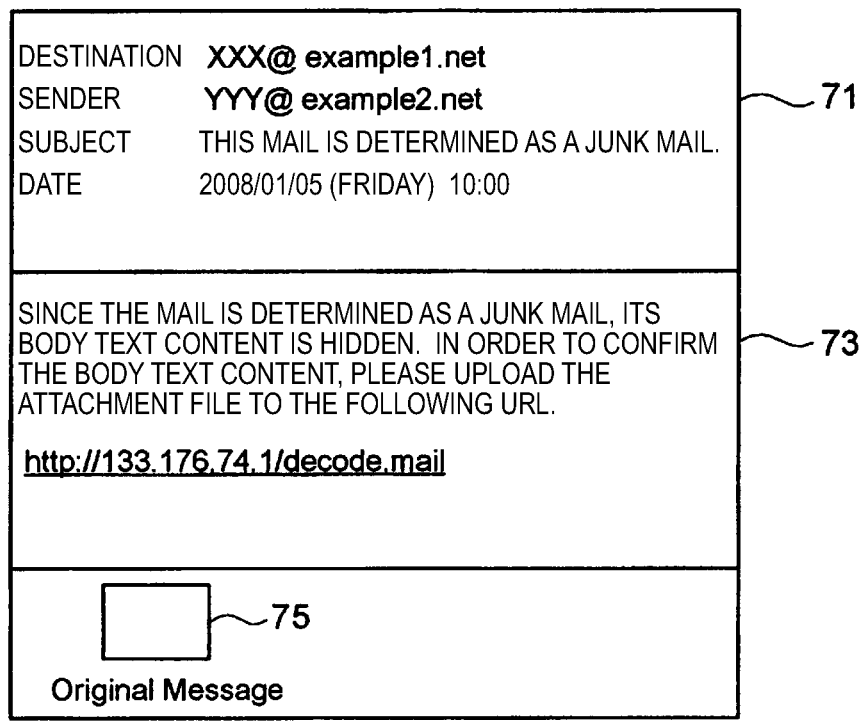
FIG. 6 is a diagram illustrating a mail screen displayed by a terminal according to a body text-hidden electronic mail message.

FIG. 6 is a diagram illustrating a mail screen displayed by the terminal 20-*i* in a case where the body text-hidden electronic mail message shown in FIG. 5 is extracted from the data packet. In a header information describing section 71 of the mail screen, individual character strings indicating a destination, a sender, a subject name, sending date and time are displayed. Further, in a body text display section 73 of the mail screen, a character string "Since this mail is determined as a junk mail, its body text content is hidden. In order to confirm the body text content, please upload the attachment file to the following URL" and the character string of "http://133.176.74.1/decode.mail") is displayed. Further, an icon 75 indicating the data which is analyzed as the attachment file by the terminal 20-*i* is displayed under the body text display section 73. In a case where a user desires to confirm the attachment file associated with the icon 75, that is, the original content of the body text part received as the hiding data, the user moves a mouse pointer (not shown) to the character string of "http://133.176.74.1/decode.mail) to thereby perform a left click manipulation.

If it is detected that the manipulation is performed, the terminal 20-*i* assembles the data packet in which the hiding data included in the body text-hidden electronic mail message is used as the payload part and the IP address ("133.176.74.1" in the example of FIG. 6) of the relay apparatus 10-*m* having the terminal 20-*i* thereunder is used as the destination IP address, and transmits the frame including the assembled data packet. The communication interface 11-1 of the relay apparatus 10-*m* receives the frame transmitted by the terminal 20-*i* and delivers the data packet included in the frame to the control section 13. Since the electronic mail message is not included in the payload part of the data packet, a determination result in step S100 in FIG. 4 becomes "No". In this case, the control section 13 determines whether the hiding data is included in the payload part of the data packet (S140).

In a case where it is determined that the hiding data is included in the payload part of the data packet delivered from the communication interfaces 11-1 and 11-2 (S140; Yes), the control section 13 performs the hiding release data storing process (S150).

After the hiding data extracted from the payload part of the data packet is stored in the hiding release data storing area in the hiding release data storing process, the control section 13 performs the message hiding release process (S160).

The message hiding release process will be described in detail. In the message hiding release process, the control section 13 decodes the hiding data stored in the hiding release data storing area and restores the text data in the body text part. Next, the control section 13 generates the HTML data by marking up the character string indicated by the text data in the restored body text part using a predetermined tag (for example, <BODY>). Further, the control section 13 assembles the data packet in which the HTML data is used as the payload part the IP address of the terminal 20-*i* under the relay apparatus 10-*m* is used as the destination IP address, and transmits the frame including the assembled data packet from the communication interface 11-1. The data packet including the electronic mail message is delivered to the terminal 20-*i* under the relay apparatus 10-*m*.

In a case where the HTML data is included in the data packet delivered from the relay apparatus 10-*m*, the terminal 20-*i* extracts the HTML data from the data packet, analyzes the extracted HTML data and then displays it on a web page screen. In this web page screen, the character string of the body text part which is determined in step S120 to have the character string offensive to public order and morals included is displayed. The user of the terminal 20-*i* can see the web page screen to thereby confirm the original content of the body text hidden by the relay apparatus 10-*m*.

In step S140, in a case where it is determined that the hiding data is not included in the payload part of the data packet (S140; No), the control section 13 performs the transfer process (S170). For example, in a case where the data packet in which the electronic mail message transmitted to the mail transfer server apparatus 30-*n* from the terminal 20-*i* under the relay apparatus 10-*m* is used as the payload part is delivered from the communication interface 11-1, or in a case where the data packet in which a command transmitted to a DNS server apparatus (not shown) or a WWW server apparatus from the terminal 20-*i* under the relay apparatus 10-*m* or a response transmitted to the terminal 20-*i* under the relay apparatus 10-*m* from the server apparatuses is used as the payload part is delivered from the communication interfaces 11-1 and 11-2, a determination result of step S140 becomes "No" and the transfer process is performed. Further, in step S120, in a case where it is determined that the character string offensive to public order and morals is not included in the body text part in the mail body of the electronic mail message (S120; No), the control section 13 performs the transfer process in a similar manner (S170). As described above, since the transfer process is the known process as the router, its detailed description will be omitted.

As described above, in this embodiment, in a case where the electronic mail message is included in the payload part of the data packet delivered from the communication interfaces 11-1 and 11-2, the control section 13 of the relay apparatus 10-*m* determines whether the character string offensive to public order and morals is included in the body text part in the mail body of the electronic mail message. Then, in a case where the character string offensive to public order and morals is included in the body text part in the mail body of the electronic mail message, the control section 13 generates the body text-hidden electronic mail message and transmits the data packet in which the body text-hidden electronic mail message used as the payload part from the communication interface 11-1. The body text-hidden electronic mail message is obtained by overwriting the hiding notification character string on the body text part in the mail body of the original electronic mail message, by describing the hiding data obtained by encoding the body text described in the body text part in the content body of the part which is separately added to the body text part, and by describing the "Content-Type: application/octet-stream" in the content header in the part.

In a case where the body text-hidden electronic mail message is received, the terminal 20-*i* analyzes the hiding data included in the electronic mail message as the attachment file, and displays an icon indicating the attachment file of the hiding data. Further, as is well known, the attachment file in which the "Content-Type:application/octet-stream" is described in the content header can be browsed by a text editor application program which is installed in the terminal 20-*i*. However, in a case where the user of the terminal 20-*i* performs a manipulation of browsing the attachment file of the hiding data using the text editor application program, since the text editor application program displays the hiding data on the basis of such an analysis that the hiding data is text data, the display content becomes a meaningless character string which is different from the body text of the original electronic mail message. Accordingly, even though the user of the terminal 20-*i* mistakenly performs the manipulation of browsing the attachment file of the hiding data, it is possible to prevent generation of the problem that an improper description or an indecent description included in the electronic mail message is seen.

Further, in a case where the electronic mail message having a plurality of parts including the body text part is stored in a determination data storing area and it is determined that the character string offensive to public order and morals is included in the body text part of the electronic mail message, the control section 13 of the relay apparatus 10-*m* uses only the content body of the body text part as the hiding data. Accordingly, compared with a case where other parts including image, audio or the like is used as hiding data, it is possible to reduce a storing area required for encoding.

Hereinbefore, one embodiment of the present invention is described, but the invention may include other embodiments, which are as follows, for example.

(1) In the above-described embodiment, the control section 13 of the relay apparatus 10-*m* uses the data obtained by encoding the content body of the body text part using the Base 64 as the hiding data, in the message hiding process. However, data obtained by encoding the body text part according to a different arbitrary encoding method such as a DES (Data Encryption Standard) or an AES (Advance Encryption Standard) may be used as the hiding data. In this case, the electronic mail message in which a decoding program obtained by decoding the hiding data using the DES or the AES is described together with the hiding data may be used as a character-hidden electronic mail message, or the character-hidden electronic mail message may be transmitted to the terminal 20-*i*.

(2) In the above-described embodiment, in the non-volatile storing section 15 of the relay apparatus 10-*m* a table may be stored in which the electronic mail address of each user of the terminal 20-*i* under the relay apparatus 10-*m* and the type (Base 64, DES, AES or the like) of the encoding method used in generation of the hiding data in a case where the character string offensive to public order and morals is included in the electronic mail message in which these electronic mail addresses are used as the destination electronic mail addresses are associated with each other. Further, in a case where the character string offensive to public order and morals is included in the body text part of the electronic mail message in which a certain electronic mail address is used as a destination electronic mail address, the control section 13 of the relay apparatus 10-*m* may read out the type of the encoding method corresponding to the electronic mail address from the table, generate the hiding data by encoding the body text part using the encoding method of the type, and transmit the body text-hidden electronic mail message in which the hiding data is described instead of the body text part.

(3) In the above-described embodiment, the control section 13 of the relay apparatus 10-*m* may encode only a part including the character string offensive to public order and morals in the content body of the body text part, without encoding all the body text parts, in the message hiding process.

(4) In the above-described embodiment, the control section 13 of the relay apparatus 10-*m* restores the body text part of the original electronic mail message from the hiding data in the message hiding release process, and then transmits the restored body text part to the terminal 20-*i* as the HTML data. However, the data file of the restored body text part may be transmitted to the terminal 20-*i* by the FTP (File Transfer Protocol), or may transmit the restored body text part to the terminal 20-*i* as the electronic mail message.

(5) In the above-described embodiment, the control program 16 is installed in the relay apparatus 10-*m*, and the control section 13 of the relay apparatus 10-*m* performs the electronic mail storing process, the determination process and the message hiding process. However, the server apparatus such as a mail transfer server apparatus 30-*n* may perform these processes.

For example, before the mail transfer server apparatus 30-*n* receives the electronic mail message from the terminal 20-*i* and transfers the electronic mail message to a different mail transfer server apparatus 30-*n*, the mail transfer server apparatus 30-*n* may perform the series of processes of the electronic mail storing process, the determination process and the message hiding process. Further, when the electronic mail message is transferred from a different mail transfer server apparatus 30-*n*, the mail transfer server apparatus 30-*n* may perform the series of processes of the electronic mail storing process, the determination process and the message hiding process. That is, the electronic mail storing process, the determination process and the message hiding process may be performed by an apparatus which relays the electronic mail from a certain apparatus to other apparatuses.

(6) In the above-described embodiment, the relay apparatus 10-*m* may perform the electronic mail storing process, the determination process and the message hiding process, and the server apparatus such as a mail transfer server apparatus 30-*n* may perform the hiding release data storing process and the message hiding release process. This embodiment can be realized in such a manner that the relay apparatus 10-*m* generates, in the message hiding process, the body text-hidden electronic mail message in which a URL of the server apparatus which performs the hiding release data storing process and the message hiding release process, instead of a URL of the relay apparatus 10-*m*, is described as the hiding notification character string, and delivers the data packet including the body text-hidden electronic mail message to the terminal 20-*i* under the relay apparatus 10-*m*.

(7) In the above-described embodiment, the control section 13 of the relay apparatus 10-*m* uses the electronic mail message described in the MIME format as a target of the electronic mail storing process, the determination process and the message hiding process. However, a web mail, a mobile phone mail or the like described by the HTML may be the target of these processes.

(8) The control program 16 in the above-described embodiment may be downloaded to a computer from a server apparatus on the Internet 90, and the computer may serve as the relay apparatus 10-*m*. Further, such a program may be stored in the storing medium for distribution.

The specific embodiments according to the present invention have been described in detail, but it is obvious to those who have ordinary skill in the art that a variety of modifications can be performed in a range without departing from the spirit of the invention.

The present application is based on Japanese Patent Application No. 2008-212490 filed on Aug. 21, 2008, the contents of which are incorporated herein by reference.

INDUSTRIAL APPLICABILITY

It is possible to prevent a receiver who receives an electronic mail message including an improper description or an indecent description from viewing the description content by an unintended manipulation.

The invention claimed is:

1. A relay apparatus comprising:
a storing section configured to store an electronic mail message, which has a MIME format;
a determining section that searches a mail body of the electronic mail message stored in the storing section for a body text part and determines whether the searched body text part contains a predetermined character string; and
a message hiding processing section that, when the determining section determines that the body text part includes the predetermined character string:
encodes the body text part according to a predetermined encoding process to generate hiding data that hides the message contained in the body text part;
generates an electronic mail message containing replacement text data that includes an address of the relay apparatus in the mail body and the hiding data that is displayed in a part different from the replacement text data; and
transmits the generated electronic mail message to a recipient destination;
a message release processing section that:
receives the transmitted hiding data from the recipient destination;
decodes the received hiding data to restore the body text part; and
transmits the restored body text part to the recipient destination.

2. The relay apparatus according to claim 1, wherein:
the storing section stores a table containing electronic mail addresses and types of encoding process applied to generate the hiding data in association with each other, and the message hiding processing section generates the hiding data according to the predetermined encoding process associated to the electronic mail address of the electronic mail message based on the table.

3. The relay apparatus according to claim 1, wherein the message hiding processing section generates the hiding data by encoding the body text part in the mail body, without encoding any image or audio data, according to the predetermined encoding process.

4. A relay method for a rely apparatus having a storage section, the relay method comprising:
a storing step of storing an electronic mail message, which has a MIME format, in the storing section;
a determining step of searching a mail body of the electronic mail message stored in the storing section for a body text part and determining whether the searched body text part contains a predetermined character string;
electronic mail message generating steps of, when the determining step determines that the body text part includes the predetermined character string:
the text body part according to a predetermined encoding process to generate hiding data that hides the message contained in the body text part;
generating an electronic mail message containing replacement text data that includes an address of the relay apparatus in the mail body and the hiding data that is displayed in a part different from the replacement text data; and
transmitting the generated electronic mail message to a recipient destination; and
message releasing steps of:
receiving the transmitted hiding data from the recipient destination;
decoding the received hiding data to restore the body text part; and
transmitting the restored body text part to the recipient destination.

5. A non-transitory computer-readable recording medium storing a program executable by a computer to execute a relay method for a reply apparatus having a storage section, the relay method comprising:
a storing step of storing an electronic mail message, which has a MIME format, in the storing section;
a determining step of searching a mail body of the electronic mail message stored in the storing section for a body text part and determining whether the searched body text part contains a predetermined character string;
electronic mail message generating steps of, when the determining step determines that the body text part includes the predetermined character string:
encoding the text body part according to a predetermined encoding process to generate hiding data that hides the message contained in the body text part;
generating an electronic mail message containing replacement text data that includes an address of the relay apparatus in the mail body and the hiding data that is displayed in a part different from the replacement text data; and
transmitting the generated electronic mail message to a recipient destination; and
message releasing steps of:
receiving the transmitted hiding data from the recipient destination;
decoding the received hiding data to restore the body text part; and
transmitting the restored body text part to the recipient destination.

* * * * *